United States Patent [19]
DeLano et al.

[11] Patent Number: 5,337,415
[45] Date of Patent: Aug. 9, 1994

[54] PREDECODING INSTRUCTIONS FOR SUPERCALAR DEPENDENCY INDICATING SIMULTANEOUS EXECUTION FOR INCREASED OPERATING FREQUENCY

[75] Inventors: Eric R. DeLano; Craig A. Gleason; Mark A. Forsyth, all of Ft. Collins, Colo.

[73] Assignee: Hewlett-Packard Company, Palo Alto, Calif.

[21] Appl. No.: 984,770

[22] Filed: Dec. 4, 1992

[51] Int. Cl.[5] .................. G06F 9/30; G06F 9/38
[52] U.S. Cl. ........................ 395/375; 395/500;
364/331.9; 364/228.7; 364/255.4; 364/262.5;
364/263; 364/931.42; 364/931.03; 364/937.8;
364/942.8; 364/946.3; 364/948.3
[58] Field of Search .................... 395/375, 800

[56] References Cited
U.S. PATENT DOCUMENTS

| | | | |
|---|---|---|---|
| 4,439,828 | 3/1984 | Martin | 395/375 |
| 4,722,050 | 1/1988 | Lee et al. | 395/375 |
| 5,136,697 | 8/1992 | Johnson | 395/375 |
| 5,197,135 | 3/1993 | Eickemeyer et al. | 395/375 |
| 5,214,763 | 5/1993 | Blaner et al. | 395/375 |

*Primary Examiner*—Robert B. Harrell
*Assistant Examiner*—Timothy L. Philipp

[57] ABSTRACT

A system and method of producing predecode bits from instructions as instructions are copied from a memory system to a cache memory unit. A predecode unit, coupled between the memory unit and the cache memory unit, produces the predecode bits for utilization by a superscalar processor. The circuitry of the predecode unit is comprised of logic and latches. The predecode unit includes two main paths for transporting instruction information: a predecode path and an instruction path. The instruction path buffers instructions sent from memory to cache as information from these instructions are decoded in the predecode path. The predecode path includes a decoder and a bit information unit. The decoder identifies the instruction type by monitoring the op-code of instructions entering the predecode unit. The bit information unit is coupled to the decoder and receives signals indicating instruction type and passes these signals through logic gates to obtain whether instructions can be bundled. The bit information unit then transfers to cache bundle signals and instruction type signals. These signals are stored as predecode bits along with instructions from the instruction path in the cache.

2 Claims, 6 Drawing Sheets

PREDECODING INSTRUCTIONS FOR SUPERCALAR DEPENDENCY INDICATING SIMULTANEOUS EXECUTION FOR INCREASED OPERATING FREQUENCY

CROSS-REFERENCE TO RELATED PATENT APPLICATION

This application is related to a pending application entitled, "System and Method for Selecting and Buffering Multiple Instructions for Simultaneous Execution in a Computer," Ser. No. 07/957,344, filed Oct. 6, 1992, which is incorporated by reference as if set forth in full hereinbelow.

BACKGROUND OF TITLE INVENTION

1. Field of the Invention

The present invention relates generally to a system and method for predecoding information from instructions for execution in a Superscalar computer. More particularly, the present invention relates to a system and method of predecoding instructions for superscalar-dependency information, as instructions are copied into cache, to increase the operating frequency of a superscalar processor.

2. Related Art

Processors used in conventional computer systems typically execute program instructions one at a time, in sequential order. The process of executing a single instruction involves several sequential steps. The first step generally involves fetching the instruction from a memory device. The second step generally involves decoding the instruction, and assembling any operands. The third step generally involves executing the instruction, and storing the results. Some processors are designed to perform each step in a single cycle of the processor clock. Alternatively, the processor may be designed so that the number of processor clock cycles per step depends on the particular instruction.

Modern computer systems commonly use an instruction cache to temporarily store blocks of instructions. Cache memories are buffers that hold information from main memory so that a processor can reach it quickly. Instructions are fetched from the instruction cache by the processor. Caches work on the principle that a processor is likely in the near future to need information in the same vicinity as the information it is working on at present. If the processor finds data it needs in cache (a cache hit), then the speed will be increased, since cache memories tend to be faster than main memory. However, if the processor does not find what it needs in cache (a cache miss), then the block containing the missing data must be brought in from main memory.

Fetching instructions from cache or memory is normally controlled by a program counter. The contents of the program counter typically indicate the starting address in cache from which the next instruction or instructions are to be fetched. Depending on the design of the processor, each instruction may have a fixed length, or a variable length. For example, a processor might be designed such that all instructions have a fixed length of 32 bits (4 bytes, or a "longword"). Fixed length instruction formats tend to simplify the instruction decode process.

Modern computers commonly use a technique known as pipelining to improve performance. Pipelining involves the overlapping of the sequential steps of the execution process. For example, while the processor is performing the execution step for one instruction, it might simultaneously perform the decode step for a second instruction, and perform a fetch of a third instruction. Pipelining can thus decrease the execution time for a sequence of instructions. Superpipelined processors attempt to further improve performance by overlapping the sub-steps of the three sequential steps discussed above.

Another technique for improving performance involves executing two or more instructions in parallel, simultaneously. Processors which utilize this technique are generally referred to as superscalar processors. The ability of a superscalar processor to execute two or more instructions simultaneously depends upon the particular instructions being executed. For example, two instructions which both require use of the same, limited processor resource (such as the floating point unit) cannot be executed simultaneously. This type of conflict is known as a resource conflict. Such instructions cannot be combined or "bundled" with each other for simultaneous execution, but must be executed alone, or bundled with other instructions. Additionally, an instruction which depends on the result produced by execution of a previous instruction cannot be bundled with that previous instruction. The instruction which depends on the result of the previous instruction is said to have a data dependency on the first instruction. Similarly, an instruction may have a procedural dependency on a previous instruction, which prevents the two instructions from being bundled. For example, an instruction which follows a branch instruction cannot be bundled with the branch instruction, since its execution depends on whether the branch is taken.

The superscalar processor must therefore be able to determine whether two or more given instructions can be bundled. Since this determination cannot be made without first decoding the instructions, the determination is commonly made by the instruction decode unit as instructions are fetched from cache. Advanced compiler techniques are used to assist the instruction decode unit to determine (as instructions are fetched from cache)—"on the fly"—whether two or more instructions can be executed in parallel by the execution unit.

As the processor decodes instructions from cache there are many possible penalties that can be incurred. One such penalty occurs during an instruction cache-miss. A cache-miss delays execution time significantly, since instructions must be fetched from main memory (which is much slower than cache) and then decoded. Additionally, decoding "on the fly" significantly slows the speed of the execution unit, since the execution unit must wait for the instruction decode unit (with the aid of compilers and software in some systems) to decide if there are any data dependencies, procedural dependencies and/or resource conflicts (before dispatching instructions for optimal simultaneous execution by the execution unit).

To speed-up execution time, some compiler systems attempt to gather information regarding the feasibility of grouping instructions for simultaneous dispatch to the execution unit, prior to the instructions being fetched from instruction cache. This aids in potential simplification and speed of instruction decode hardware.

To gather information prior to instructions being fetched from cache some conventional superscalar processor system architectures utilize software compilers when generating machine instructions from source code to determine in advance of fetching from cache whether groups of instructions can be dispatched simultaneously to the processor functional units. These conventional systems then encode one or more bits in the actual instruction operational code (op-code) where this encoded information (in the op-code) can be utilized by the instruction decode hardware.

There are a number of disadvantages associated with the aforementioned "predecode" techniques. First, the predecode information is employed as part of the instruction set architecture. This means that every possible processor implementation of this architecture must interpret the information identically to have old code perform optimally on new machines (in other words, to maintain object-code compatibility). Therefore, flexibility for every possible processor implementation to optimize the number and encoding of the predecoded information in op-code is sacrificed.

Second, performance improvements in superscalar instruction execution can only be realized on code which was generated with compilers that are modified to correctly predecode instructions and encode the op-code bits correctly. This is a disadvantage in cases where existing object code does not utilize the feature. Additionally, this adds complexity to compiler software.

Third, the aforementioned predecode techniques require using bits in the actual instruction op-code. This reduces the amount of information that can otherwise be encoded severely restricting how many bits of predecoded information can practically be used by the system.

SUMMARY OF INVENTION

The present invention is directed to a system and method of predecoding instructions for superscalar-dependency information. As instructions are copied into cache, the superscalar dependency information is stored as "predecode" bits for utilization during decode and execution times, to increase the operating frequency of a superscalar processor. In a preferred embodiment, a predecode unit decodes two or more instructions prior to writing them to cache (i.e., during a cache miss). This predecode information (predecode bits) are written into cache along with the instructions predecoded by the predecode unit. Then during instruction decode and execution time, the processor can select instruction words based on the predecode bits from cache for optimal simultaneous execution in a superscalar processor.

The circuitry of predecode unit is comprised of logic and latches. The predecode unit includes two main paths for transporting instruction information: a predecode path and an instruction path. The instruction path buffers instructions sent from memory to cache as information from these instructions are decoded in the predecode path. Generally, even addressed instructions enter the predecode unit first. Odd addressed instructions enter the predecode unit second.

The predecode path includes a decoder and a bit information unit. The decoder identifies the instruction type by monitoring the op-code of instructions entering the predecode unit. The bit information unit is coupled to the decoder and receives signals indicating instruction type. It then passes these signals through logic gates to determine whether instructions can be bundled. The bit information unit transfers to cache bundle signals and instruction type signals. These signals are stored as predecode bits along with instructions from the instruction path.

The predecode unit by use of predecode bits speeds-up steering of instructions to their proper functional units. For example a single predecode signal or bit is used to quickly steer floating-point operations to a floating point unit. By predecoding information before fetching instructions from cache, the predecode unit of the present invention maximizes speed critical operations that occur in an execution unit of a processing system. In most computer systems, frequency and performance are much more sensitive to the speed at which instruction can be read from cache, than to the speed at which instructions are written to cache due to a cache miss. Therefore, adding a predecode unit (as described herein) in series with the cache-fill-path does not slow down the superscalar processor.

Knowing when two or more instructions can be bundled (executed together) can be a significant limitation in the decode path without the use of predecode bits. Knowing whether a bundle has arrived can influence how subsequent instructions are fetched and buffered from memory. The predecode unit by use of predecode bits speeds-up bundling. A bundle signal is used to indicate when two instructions can be properly executed together before decode and execution times.

FEATURES AND ADVANTAGES OF THE INVENTION

One feature of the present invention is to decode bit information from instructions for superscalar dependency information as instructions are copied into cache. This reduces the time required to decide whether instructions can be executed simultaneously and provides an indication of which functional unit instructions should be assigned for execution. This allows the processor to operate at faster frequencies than existing methods.

Another feature of the present invention is simplicity and flexibility. The present invention can be implemented with simple hardware components without the need for modifying compiler or assembler technology. Additionally, there is no need to re-compile or reassemble object code in order to take advantage of the predecoding capability of the present invention. This makes the present invention a far cheaper alternative to other decoding systems.

A further feature of the present invention is that by employing hardware predecoding an unlimited number of bits can be predecoded without any loss of object-code compatibility. This significantly increases the amount of predecoding bits that can be utilized without reducing the amount of information that can be encoded in the actual instruction op-code.

Further features and advantages of the present invention, as well as the structure and operation of various embodiments of the present invention, are described in detail below with reference to the accompanying drawings.

BRIEF DESCRIPTION OF THE DRAWINGS

The left-most digit of a reference number identifies the drawing in which the reference number first appears.

DETAILED DESCRIPTION OF THE INVENTION

1.0 Overview

The present invention relates to a system and method for predecoding instructions for superscalar dependency information as instructions are copied into cache and storing this information in cache along with the instructions as "predecode" bits. In a preferred embodiment, the invention includes a method and circuitry for producing predecode bits which indicate whether instructions can be bundled. The predecode bits also indicate what resources in the execution unit the instructions will use.

A patent application entitled "System and Method for Selecting and Buffering multiple Instructions for Simultaneous Execution in A Computer," (Ser. No. 07/957,344, filed on Oct. 6, 1992, (hereinafter the cross reference patent) describes an instruction selector unit and instruction decode unit that utilize predecode information. The system described in the cross reference patent can be implemented to operate with the predecode information generated by the present invention.

2.0 System Environment

The following is a discussion of a system environment in which the present invention operates.

Figure 1:
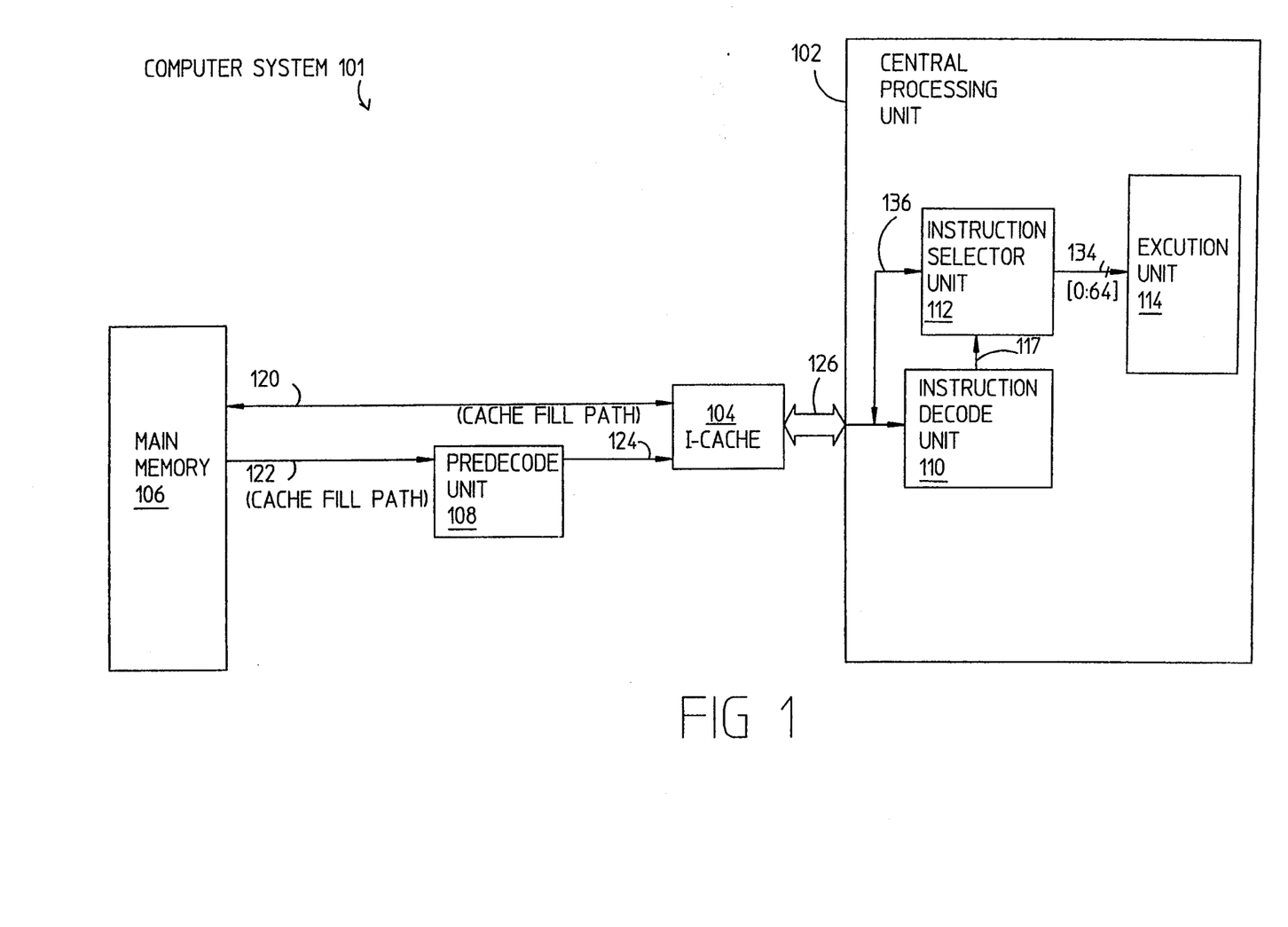
FIG. 1 is a block diagram of a computer system 101 which includes a predecode unit 101.

FIG. 1 is a block diagram of a computer system 101. Computer system 101 includes: a Central Processing Unit (CPU) 102; an Instruction Cache (cache) 104; Main Memory 106; and an Instruction Predecode Unit (Predecode Unit) 108.

CPU 102 of the preferred embodiment has a fixed instruction length of 32 bits, or one longword, and is capable of executing two instructions simultaneously. Other instruction lengths and bundle sizes are possible, as is apparent to those skilled in the art. In the preferred embodiment, CPU 102 is a precision architecture reduced-instruction-set computer (PA-RISC) superscalar processor, currently employed in Series 800 and 900 multi-user workstations of Hewlett-Packard Company, Palo Alto, Calif. U.S.A., see *A High Speed Superscalar PA-RISC Processor,* DeLano, E., et al., IEEE Computer Society Press Reprint from Proceeding of the Compcon Spring 1992 Digest of Papers, pp. 116–124 (1992) (incorporated herein by reference). It should be noted that many other CPU architectures can be utilized employing most CISC or RISC designs; for other such examples see *Superscalar Microprocessor Design,* Johnson, M., Chapter 3, pp. 44–48, Prentice Hall, Englewood Cliffs, N.J. (1991) (incorporated herein by reference).

Generally, CPU 102 operates by fetching instructions from cache 104 in 64-bit double longword quantities (in the preferred embodiment, cache 104 is direct mapped structure, however, cache 104 may be implemented as set-associative structure or a fully-associative structure). Thus, CPU 102 is capable of fetching two instructions simultaneously. Fetching of instructions is controlled by a program counter (not shown) via instruction selector unit 112. Instruction selector unit 112 provides an address to cache 104 via busses 126, 136. The address on busses 126, 136 specifies the location of the doublelongword to be read from cache 104.

Cache 104 transmits instructions to CPU 102 via bus 126. An instruction decode unit 110 and instructor selector unit 112 receive the instructions. Instruction decode unit 110 decodes instructions sent from cache 104. Instruction decode unit 110 provides a bundle signal 117 to instruction selector unit 112 that indicates whether a given pair of instructions can be bundled. CPU 102 receives this bundling information from the predecode unit 108, discussed in detail below. The instruction selector unit 112 then supplies multiple aligned misaligned instructions to an execution unit 114. Execution unit 114 is capable of executing 2 bundled instructions simultaneously. In the preferred embodiment, instructor selector unit 112 supplies instructions to execution unit 114 via bus 134 to multiple operational or functional units, such as a floating point unit (not shown) and an integer unit (not shown).

Main memory 106 supplies instructions to cache 104. For instance, if cache 104 does not contain instructions needed by CPU 102, cache 104 handles this miss by sending an address request signal 120 to main memory 106. Main memory 106 responds by returning the requested instructions to cache 104 via a 32-bit data bus 122.

Before cache 104 receives the requested instructions, they are first sent to the instruction predecode unit 108 via bus 122. The predecode unit 108 then sends two longword instructions to cache 104, via bus 124. Along with the two longword instructions, the instruction predecode unit 108 also sends pre-decoded bit information associated with the two longword instructions. The bit information is stored in cache 104. The execution unit 114 executes instructions in accordance with the pre-decoded bit information.

The predecode unit 108 predecodes instructions as they are copied into cache 104. This predecode information is stored in cache 104, along with the instruction pairs as "predecode bits." Predecode bits may be stored with the instruction pairs, or be stored as in the preferred embodiment, in individual "predecode-bit storage." The predecode bits may also be stored elsewhere in the system for optimum utilization.

When the predecode bits are read from cache 104 during normal instructions fetches, they are used to speed up critical circuit operations associated with superscalar execution of the execution unit 114. In most computer systems frequency and performance are much more sensitive to the speed at which instructions can be read from cache 104, than to the speed that instructions are written to cache 104 from main memory 106 due to a cache miss. Therefore, adding the predecode unit 108 in series with the cache-filled path 122, 124 does not slow down the CPU 102.

The operation and circuitry of predecode unit 108 will now be described in detail.

3.0 Structure and Operation of the Predecode Unit

The following discussion is broken down into two subcategories: (A) structure and (B) operation.

A. Structure

Figure 2:
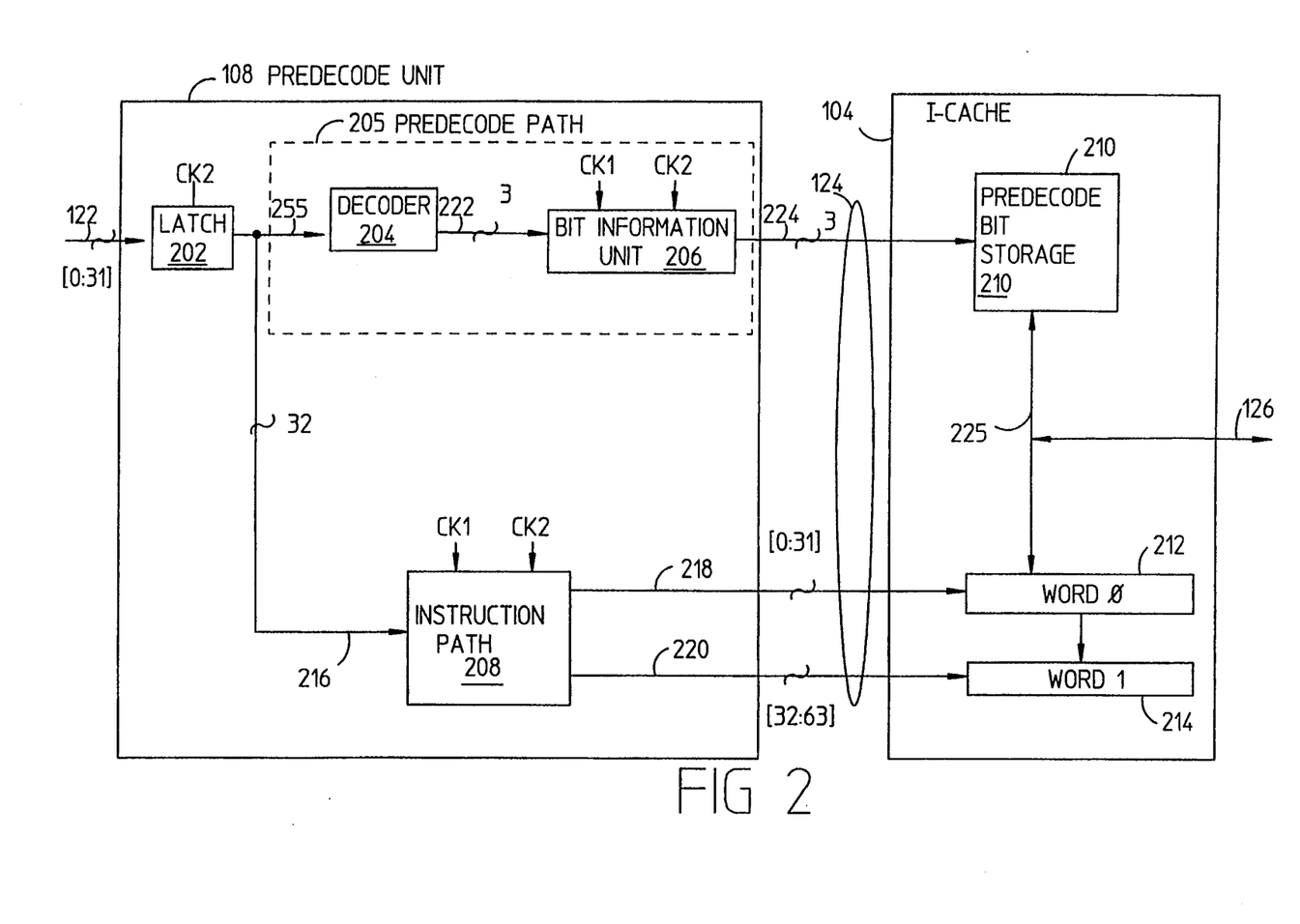
FIG. 2 is a block diagram of the predecode unit 108 and cache 104.

FIG. 2 is a block diagram of the predecode unit 108 and cache 104. Predecode unit 108 includes two main paths for transporting instruction information: a predecode path 205 (shown in dotted lines) and an instruction path 208. The instruction path 208 buffers instructions sent from memory 106 to cache 104 as information from these instructions are decoded in the predecode path 205.

The predecode path 205 detects what type of instructions are filling a cache miss. Additionally, the predecode path 205 detects whether two instructions have data dependencies or can be bundled. Predecode path 205 includes: a decoder 204 and a bit information unit 206. Decoder 204 accepts certain encoded information from latch 202. That is, decoder 204 monitors the op-code of an instruction.

In the preferred embodiment, the first six most significant bits (0-6) of a 32-bit instruction is the op-code portion of the instruction. The op-code identifies the operation to be performed by the 32-bit instruction. For example, a branch is identified if the first six bits are 1xx1xx, where x=0 or 1. A floating-point instruction is identified if one of four conditions is present: 1) 001100; 2) 000110; 3) 100110; AND 4) 001110. The aforementioned is used in the Series 800 and 900 multi-user workstations.

The decoder of the type shown in FIG. 2 is instruction-set specific, and can easily be designed and implemented as is well known to those skilled in the art. It should be noted that all instructions are system specific and vary depending on the instruction set employed for a particular computer system. Accordingly, those skilled in the art understand that software and hardware designers normally develop their own unique op-code tailored for their own computer system. It is also understood that a hardware designer with ordinary skill in the art can construct a decoder of the type shown in FIG. 2 for their own unique instruction set.

The bit information unit 206 is coupled to the decoder 204 and passes decoded bit information to cache 104. The bit information unit 206 also determines whether two instructions can be bundled.

Figure 3:
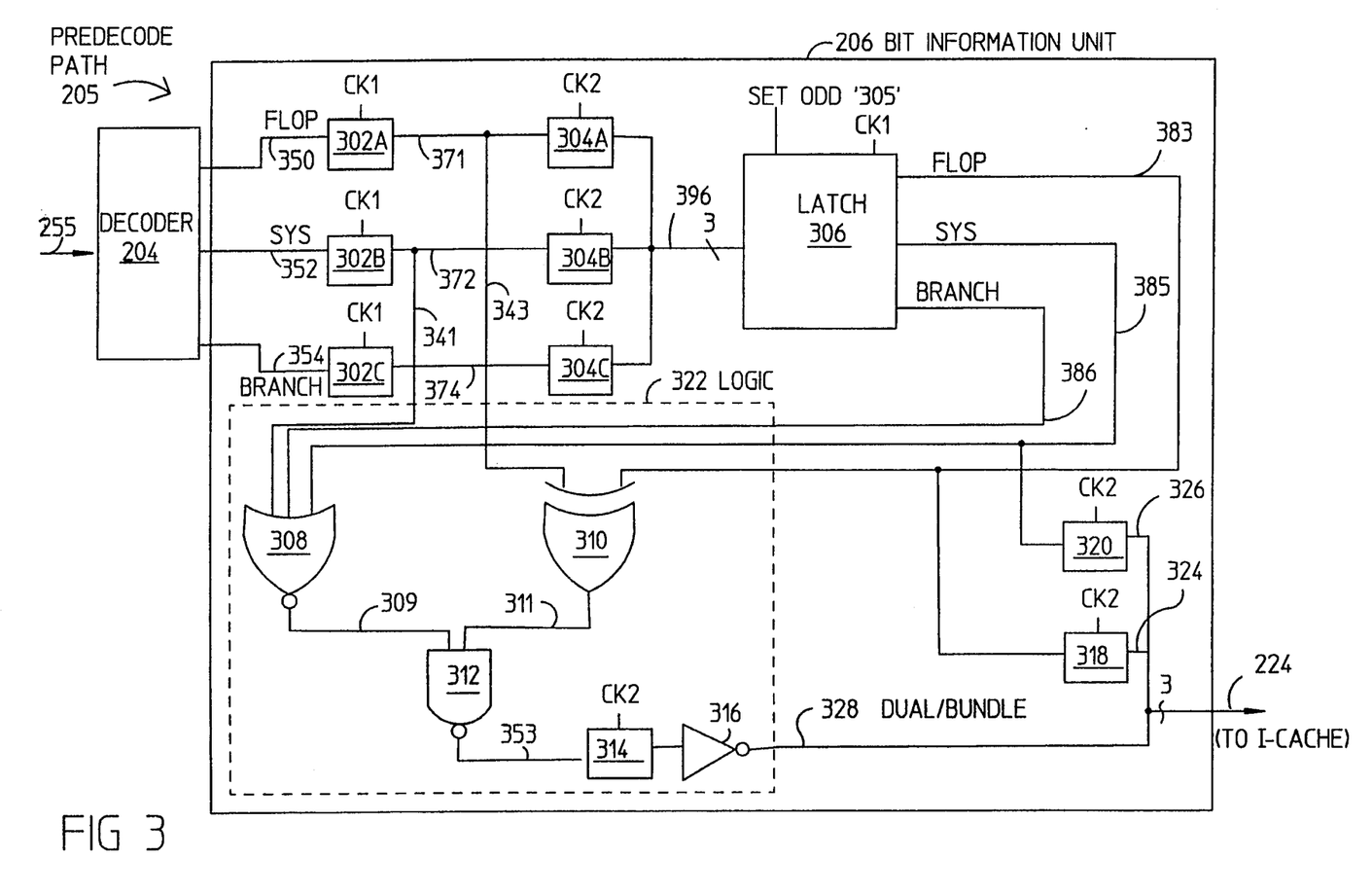
FIG. 3 is a circuit diagram of the predecode path 205.

FIG. 3 is a circuit diagram of the predecode path 205. Bit information unit 206 includes: latches 302, 304, 306, 314, 318, and 320, and logic 322. Latches 302, 304, 306, 314, 318, and 320 store bit information as this bit information is sent to cache 104. A two-phase clocking system, a clock 1 (CK1) and a clock 2 (CK2), control the flow of data through latches 302, 304, 306, 314, 318, and 320. Logic 322 controls whether a bundle signal 328 is active (indicating that two instructions can be bundled). Logic 322 includes: a NOR gate 308, an Exclusive OR gate 310, a NAND gate 312 and an inverter 316.

Figure 4:
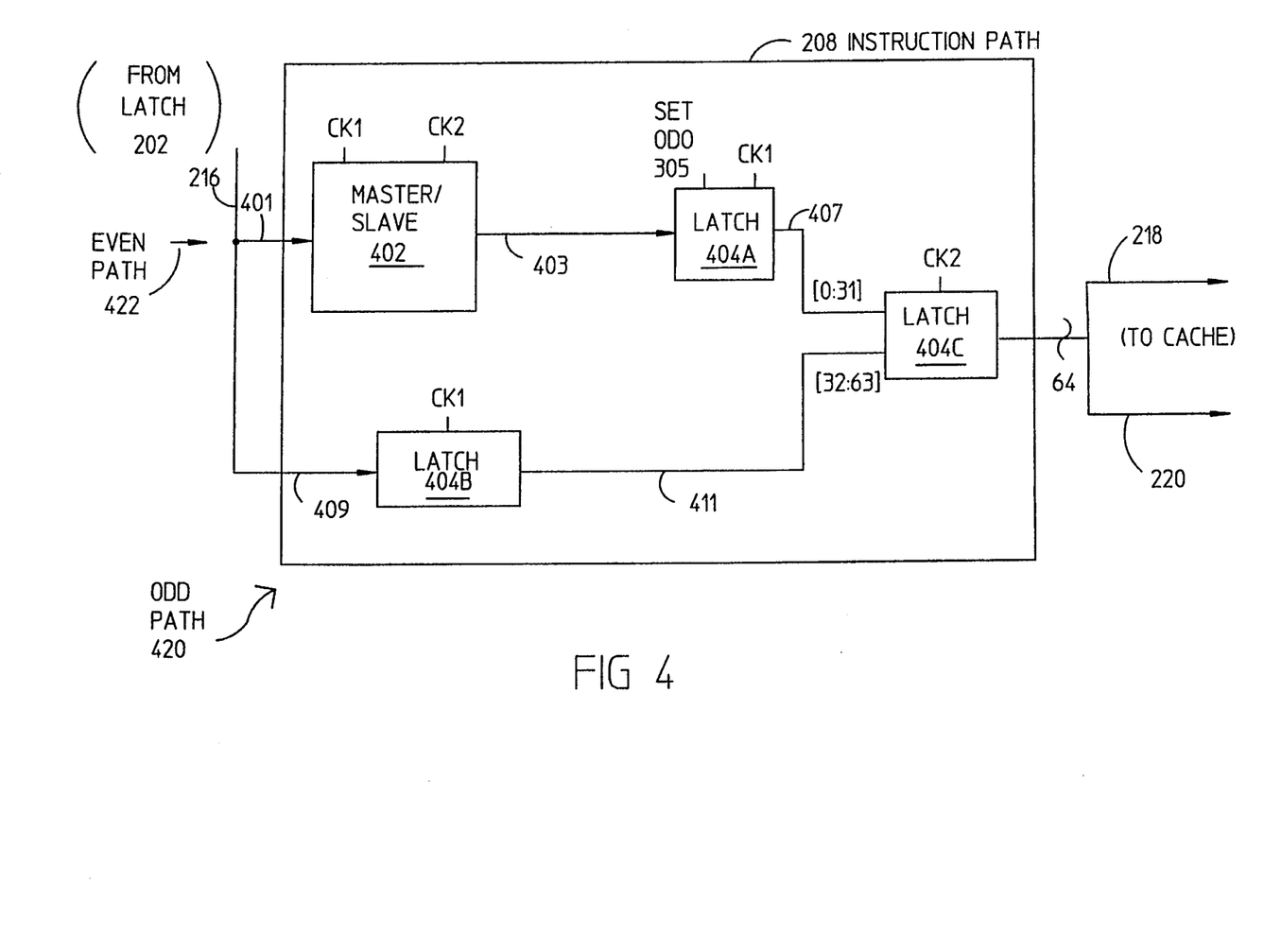
FIG. 4 is a circuit diagram of instruction path 208.

FIG. 4 is a circuit diagram of the instruction path 208. As explained above, instruction path 208 transfers instructions sent from main memory 106 to cache 104. In the preferred embodiment, instructions are sent to cache 104 in aligned format (even and odd addressed instructions). The instruction path 208 includes an even path 422 for transporting even addressed instruction and an odd path 420 for transporting odd addressed instructions. Even path 422 includes a master/slave register 402, latches 404A and 404C. Odd path 420 includes latches 404B and 404C. Latch 404C is actually two 32-bit latches shown as a single 64-bit latch for storing odd addressed and even addressed instructions. CK1 and CK2 control the flow of data through instruction path 208.

B. Operation

Figure 5:
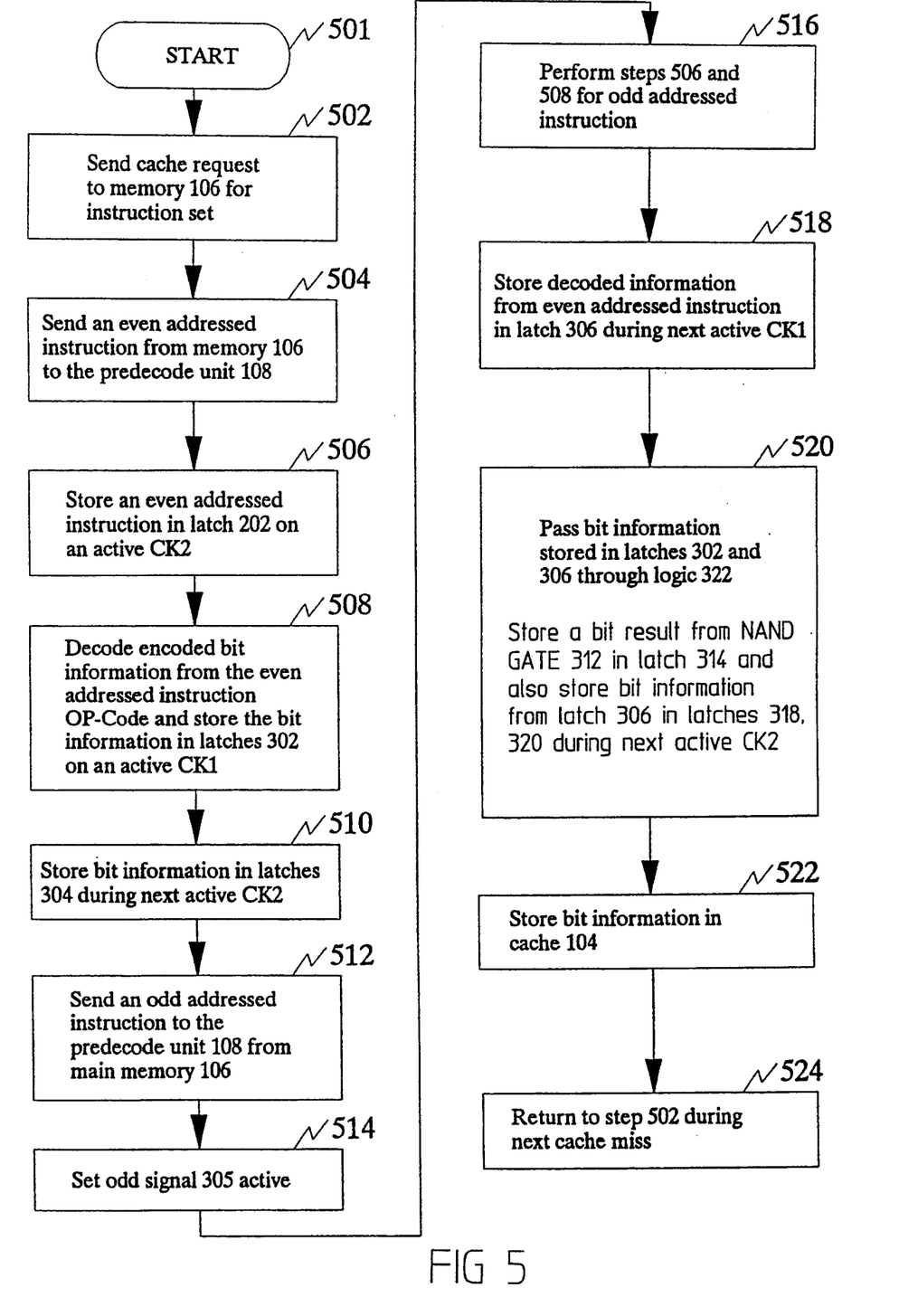
FIG. 5 is a flow chart illustrating the operation of the predecode path 205.
Figure 6:
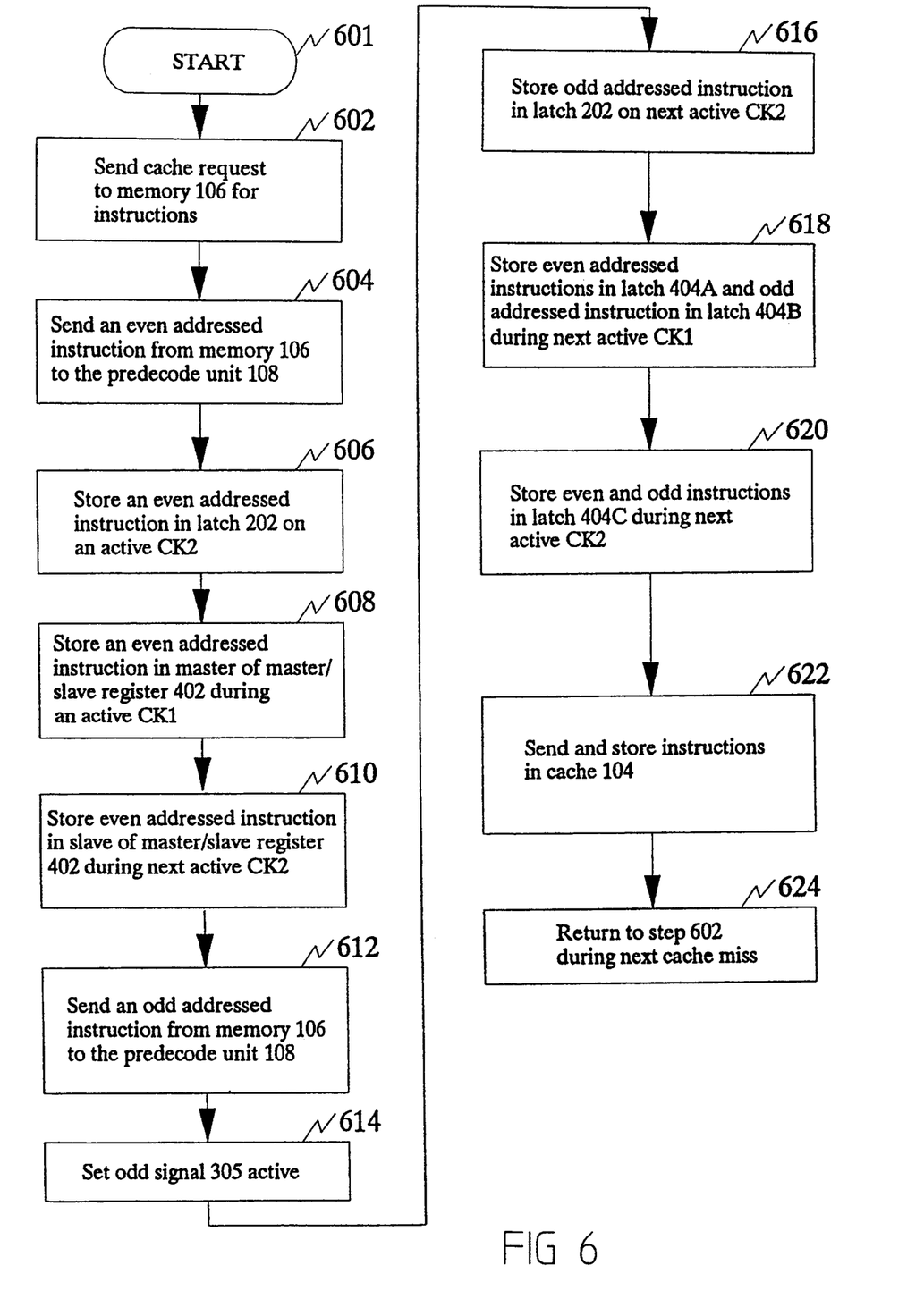
FIG. 6 is a flow chart illustrating the operation of the instruction path 208.

The operation of the predecode unit 108 will now be described. FIG. 5 is a flow chart illustrating the operation of the predecode path 205. FIG. 6 is a flow chart illustrating the operation of the instruction path 208. When describing the flowcharts of FIGS. 5 and 6 below, reference will be made to structural elements in FIGS. 1-4.

1. Predecode Path

Referring to FIG. 5, in step 502, cache 104 sends an address request 120 to main memory 106 (typically during a cache miss). Instructions are located in main memory 106 at aligned doublelongword address locations. One aligned doublelongword address location includes an even addressed instruction and an odd addressed instruction.

In step 504, main memory 106 sends the instruction located at the even addressed location to the predecode unit 108 via bus 122. In the preferred embodiment, even addressed instructions are always sent to the predecode unit 108 before odd addressed instructions.

In step 506, even addressed instructions are stored in latch 202 when CK2 goes active.

In step 508, decoder 204 decodes encoded information from the op-code of the even addressed instruction received from latch 202. In other words, in step 508, decoder 204 identifies what type of instruction was just fetched from memory 106. In the preferred embodiment, there are three instruction types that decoder 204 identifies. Referring to FIG. 3, these include: floating-point operations (FLOP) 350, system instructions (SYS) 352 (instructions that cannot be bundled with other instructions, e.g., flush cache) and branch 354 (indicating a target address to modify the PC (not shown) count). Integer operations are assumed by default when signals 350, 352, and 354 are inactive. In the preferred embodiment, a logic high bit (e.g., 1) is active and a logic low bit (e.g., 0) is inactive.

Also in step 508, bit information decoded by the decoder 204, is stored in latches 302A, 302B, and 302C, (collectively latches 302) when CK1 goes active.

In step 510, decoded bit information relating to the even addressed instruction are transported on busses 370, 372, and 374 and stored in latches 304 (collectively) when the next phase of CK2 goes active.

In step 512, odd addressed instructions are sent from memory 106 to the predecode unit 108 via bus 122. When the odd addressed instruction is sent to the predecode unit 108, main memory 106 sends an active "set odd signal" 305. Set odd signal 305 on latch 306 accounts for system delays when retrieving odd addressed instructions from main memory 106, as performed in step 514. Set odd signal 305 is not necessary for systems that have no retrieval delays from main memory 106.

At this point, the predecode unit 108 has received both an odd and even addressed instruction from main memory 106 and has decoded the even addressed instructions. Now, in step 516, the odd addressed instruction will be decoded. Accordingly, steps 506 and 508 are repeated, but for odd addressed instructions. On the next active phase of CK2, the odd addressed instruction is stored in latch 202. Encoded information from the odd instruction passes through the decoder 204 via bus 255. Bit information from the odd addressed instruction produced by the decoder 204 is stored in latches 302 on the next active phase of CK1.

Also during the active phase of CK1, decoded even bit information (FLOP, SYS, branch) is transported to latch 306 via bus 396 and stored. As explained above, set odd signal 305 must be active before decoded bit information from the even addressed instruction can be transferred and stored in latch 306.

In step 520, it is determined whether the even addressed instruction and the odd addressed instruction can be bundled. This is performed by passing decoded bit information from the odd addressed instruction (stored in latches 302) and even addressed instruction (stored in latch 306) through logic 322 to produce a logic high or a logic low bundle signal 328. Table A below illustrates what bit information produces a logic high and logic low bundle signal 328.

| ODD ADDRESSED INSTRUCTION decode bit information from latch 306 | EVEN ADDRESSED INSTRUCTION decode bit information from latch 306 | BUNDLE SIGNAL 328 |
|---|---|---|
| FLOP 343 = 1<br>SYS 341 = 0<br>BRANCH 374 = 0 | FLOP 383 = 0<br>SYS 385 = 0<br>BRANCH 386 = 0 | LOGIC HIGH<br>1 |
| FLOP 343 = 0<br>SYS 341 = 0<br>BRANCH 374 = 0 | FLOP 383 = 1<br>SYS 385 = 0<br>BRANCH 386 = 0 | LOGIC HIGH<br>1 |
| FLOP 343 = 0<br>SYS 341 = 0<br>BRANCH 374 = 1 | FLOP 383 = 1<br>SYS 385 = 0<br>BRANCH 386 = 0 | LOGIC HIGH<br>1 |
| FLOP 343 = X<br>SYS 341 = X<br>BRANCH 374 = X | FLOP 383 = 0<br>SYS 385 = 0<br>BRANCH 386 = 1 | LOGIC LOW<br>0 |
| FLOP 343 = 0<br>SYS 341 = 1<br>BRANCH 374 = 0 | FLOP 383 = X<br>SYS 385 = X<br>BRANCH 386 = X | LOGIC LOW<br>0 |
| FLOP 343 = 0<br>SYS 341 = X<br>BRANCH 374 = X | FLOP 383 = 0<br>SYS 385 = 1<br>BRANCH 386 = 0<br>LOGIC 322 | LOGIC LOW<br>0 |

Table A can be summarized as follows: There are three ways in which two instructions can be bundled in the preferred embodiment: (1) even addressed instructions indicating an integer operation can be bundled with an odd addressed instruction indicating a FLOP; (2) even addressed instructions indicating a FLOP can be bundled with an odd addressed instruction indicating an integer operation; and (3) even addressed instructions indicating a FLOP can be bundled with an odd addressed instruction indicating a branch. SYS instructions can never be bundled. An even branch cannot be bundled.

The following is a detailed example illustrating how a logic high bundle bit or signal 328 is produced from logic 322. In this example, the even addressed instruction is a FLOP and the odd addressed instruction is an integer operation. Accordingly, in step 520, the inputs to NOR gate 308 are ODD SYS 341=0, EVEN branch 386=0, and EVEN SYS 385=0. Thus, NOR gate 308 produces an output signal 309=1.

The inputs to exclusive OR gate 310 are ODD FLOP 343=0 and EVEN FLOP 383=1. Thus, Exclusive OR gate 310 produces an output signal 311 and =1. Accordingly, NAND gate 312 having input terminals 309 and 311 both equal to logic 1 produces an output signal 353=0. Once output signal 353 passes through inverter 316 after CK2 goes active, bundle signal 328 will equal logic 1. Therefore, the even addressed instruction and the odd addressed instruction sent to cache 104 can be bundled.

Additionally, in step 520, bit information from NAND gate 312 is stored in latch 314. Also, decoded bit information from the even instructions, FLOP 383 and SYS 385 are stored in latches 318 and 320, respectively.

In step 522, cache 104 reads signals 324, 326, and 328 (collectively 224). These three bits 324, 326, and 328 are then stored in cache 104 in predecode bit storage 210 or with the instruction words 212, 214.

In step 524, the process of predecoding instructions in the cache fill path 122, 124, will occur again once cache 104 experiences another cache miss.

Thus, predecode path 205 to detects what type of instructions are filling a cache miss. Additionally, predecode path 205 can detect whether two instructions have data dependencies and these instructions can be bundled (in the interest of simplifying superscalar design). As is apparent to those skilled in the art, the predecode unit 108 can be applied in more general ways. For instance, different classes of instructions can be predecoded to speed up complex bundling rules. For example, a processor design might only allow a branch instruction in a bundle if it is the youngest instruction (in program order). Having a predecode bit that indicates "branch" could help such a design. This bit could also be used to steer branch instructions to a dedicated branch unit (not shown).

In the preferred embodiment, no predecoding of "odd" instruction is necessary (except for bundle signal 328). This is an implementation anomaly due to the way instructions are steered to the functional units in the execution unit 114.

2. Instruction Path 208

Instruction path 208 provides a mechanism for transporting instructions to cache 104 as information from these instructions is decoded in the predecode path 205. The operational steps of the predecode path 205 and the instruction path 208 occur simultaneously. Accordingly, referring to FIGS. 5 and 6, operational steps 501–524 correspond to steps 601–624. Thus, the instruction path 208 and the predecode path 205 operate in unison. This permits cache 104 to read all decoded bit information 224 and instructions 218, 220 (collectively 124), from the predecode unit 108 at the same time.

Referring to FIG. 6, in step 602, cache 104 sends an address request 120 to main memory 106 (typically during a cache miss). In step 604, main memory 106 sends the even addressed instruction to the predecode unit 108 via bus 122. In step 606, the even addressed instruction is stored in latch 202 when CK2 goes active.

In step 608, the even addressed instruction is transferred from latch via busses 216, 401, to master/slave register 402. The even addressed instruction is then stored in the master of master/slave register 402 when CK1 goes active.

In step 610, the even addressed instruction is transferred to the slave of master/slave register 402 when CK2 goes active.

In step 612, the odd addressed instruction is sent from main memory 106 to the predecode unit 108 via bus 122. When the odd addressed instruction is sent to the predecode unit 108, main memory 106 sets the odd signal 305 active. As explained above, odd signal 305 accounts for possible system delays when retrieving the odd addressed instructions from main memory 106. This permits latch 404A to store the even addressed instruction when the odd addressed instruction is received. Set odd signal 305 active is indicated in step 614.

In step 616, the odd addressed instruction is stored in latch 202 when CK2 goes active. At this point, the predecode unit 108 has received both the odd and even addressed instruction from main memory 106. In step 618, the odd addressed instruction is transferred to latch 404B via busses 216, 409. The odd addressed instruction is stored in latch 404B when the next CK1 goes active. Additionally, the even addressed instruction is stored in latch 404A.

In step 620, the even and odd instructions are transferred from latches 404A and 404B, respectively, to latch 404C via busses 407, 411. The even and odd addressed instructions are then stored in latch 404C during the next active CK2. In step 622, the even and odd addressed instructions are transferred to cache 104 and stored in word locations 212, 214. In step 624, the process of predecoding instructions will reoccur when cache 104 experiences another cache miss.

While various embodiments of the present invention have been described above, it should be understood that they have been presented by way of example only, and are not intended to be limiting. Thus, the breadth and scope of the present invention should not be limited by any of the above-described exemplary embodiments, but should be defined only in accordance with the filing claims and their equivalents.

What is claimed is:

1. A predecoder unit, which operates in a superscalar processor environment, for predecoding instructions for superscalar dependency information, said predecoder generates predecode bits from said instructions when said instructions are copied into a cache memory unit from a memory unit for utilization by a superscalar processor, the predecoder unit comprising:

decoder means, coupled to the memory unit, for receiving encoded information from a first instruction and a second instruction, wherein said decoder means generates three bits in a first clock cycle indicative of whether said first instruction is a floating-point operation, a system operation, a branch operation or an integer operation, and generates three bits in a second clock cycle indicative of whether said second instruction is a floating-point operation, a system operation a branch operation or an integer operation;

a first set of latches, coupled to said decoder means for storing during said first clock cycle said three bits from said first instruction and for storing during said second clock cycle said three bits from said second instruction;

a second set of latches, coupled to said first set of latches, for storing during said second clock cycle said three bits from said first instruction;

logic means, coupled to said first and second set of latches, for generating an active bundle signal, wherein said active bundle signal indicates that said first and second instructions will be executed simultaneously when:

(a) said first and second instructions are integer instructions, (b) said first instruction is a floating-point operation and said second instruction is an integer instruction, or (c) said first instruction is floating point operation and said second instruction is a branch instruction.

2. The predecoder unit of claim 1 wherein said logic means includes:

a NOR gate having a first input terminal coupled to said first set of latches to receive a bit indicating whether said second instruction is a system instruction and having second and third input terminals coupled to said second set of latches to receive a bit indicating whether said first instruction is a branch instruction and a bit indicating whether said first instruction is a floating-point operation, wherein said NOR gate produces an output signal based on said received bits;

an exclusive OR gate having a first input terminal coupled to said first set of latches to receive a bit indicating whether said second instruction is a floating-point operation, having a second input terminal coupled to said second set of latches to receive a bit indicating whether said first instruction is a floating-point operation, wherein said exclusive OR gate produces an output signal based on said received bits; and a NAND gate to receive output signals received from said NOR gate and said exclusive OR gate and to generate said bundle signal based on said received signals.

* * * * *

UNITED STATES PATENT AND TRADEMARK OFFICE
CERTIFICATE OF CORRECTION

PATENT NO. : 5,337,415
DATED : August 9, 1994
INVENTOR(S) : Kenneth P. Parker, et al It is certified that error appears in the above-identified patent and that said Letters Patent is hereby corrected as shown below:

On the title page, item [21] Appl. No. "984,770" should read -- 985,770 --.

Signed and Sealed this

Thirty-first Day of March, 1998

Attest:

BRUCE LEHMAN

Attesting Officer

Commissioner of Patents and Trademarks